US007308910B2

(12) United States Patent
Weber

(10) Patent No.: US 7,308,910 B2
(45) Date of Patent: Dec. 18, 2007

(54) DEVICE FOR DAMPING PRESSURE SURGES

(75) Inventor: Norbert Weber, Sulzbach/Saar (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/567,963

(22) PCT Filed: Oct. 1, 2004

(86) PCT No.: PCT/EP2004/010971

§ 371 (c)(1),
(2), (4) Date: Feb. 10, 2006

(87) PCT Pub. No.: WO2005/052348

PCT Pub. Date: Jun. 9, 2005

(65) Prior Publication Data

US 2006/0225800 A1 Oct. 12, 2006

(30) Foreign Application Priority Data

Oct. 31, 2003 (DE) ................................ 103 50 941

(51) Int. Cl.
*F16L 55/04* (2006.01)

(52) U.S. Cl. .......................................... 138/31; 138/30

(58) Field of Classification Search .................. 138/30, 138/31

See application file for complete search history.

(56) References Cited

U.S. PATENT DOCUMENTS 2,871,995 A * 2/1959 Cline ......................... 188/152
3,174,505 A * 3/1965 Bauer .................... 137/505.18
3,288,166 A * 11/1966 Wagner ...................... 137/509
4,068,684 A 1/1978 Greer
4,450,870 A * 5/1984 Vick .......................... 138/31
4,461,322 A * 7/1984 Mills .......................... 138/31
4,640,555 A * 2/1987 Bertling et al. ............... 303/10
4,708,404 A * 11/1987 Seibert et al. ........... 303/114.1
4,799,048 A * 1/1989 Goshima et al. ............ 340/626
5,148,834 A * 9/1992 Reinartz et al. .............. 138/31
5,219,000 A * 6/1993 Chalasani et al. ............ 138/31
5,373,865 A * 12/1994 Jung et al. ............. 137/115.19
5,456,233 A 10/1995 Felhofer
5,471,959 A 12/1995 Sturman
5,620,028 A * 4/1997 Johnston et al. .............. 138/30
5,701,869 A 12/1997 Richardson (Continued)

FOREIGN PATENT DOCUMENTS

DE 195 39 885 A1 11/1996

(Continued)

*Primary Examiner*—James Hook
(74) *Attorney, Agent, or Firm*—Roylance, Abrams, Berdo & Goodman, L.L.P.

(57) ABSTRACT

A device for damping pressure surges in a fluid with a housing (10) and a piston (14) that can be longitudinally displaced inside the housing (10) against the pretensioning force of a spring energy store (12). The piston (14) interacts with another piston (24), which is guided in a connecting piece (26) of the housing (10) in a manner that enables it to be longitudinally displaced. During the operation of the device, the piston (14) exerts a pressure force onto the other piston (24) when the other piston is in any displacement position. Even pressure surges occurring with a high frequency can be reliably controlled in a functionally reliable manner.

16 Claims, 1 Drawing Sheet

U.S. PATENT DOCUMENTS

| | | | | |
|---|---|---|---|---|
| 5,971,027 | A | 10/1999 | Beachley | |
| 6,390,133 | B1 | 5/2002 | Patterson | |
| 6,478,051 | B1 * | 11/2002 | Drumm et al. | 138/30 |
| 6,604,508 | B2 | 8/2003 | Meffert | |
| 6,988,514 | B2 * | 1/2006 | Weber | 138/30 |
| 2003/0183197 | A1 | 10/2003 | de Ojeda | |

FOREIGN PATENT DOCUMENTS

| | | | |
|---|---|---|---|
| DE | 100 51 580 | A1 | 5/2002 |
| DE | 101 48 220 | A1 | 4/2003 |
| EP | 1 217 201 | A2 | 6/2002 |
| WO | WO 00/31420 | | 6/2000 |

* cited by examiner

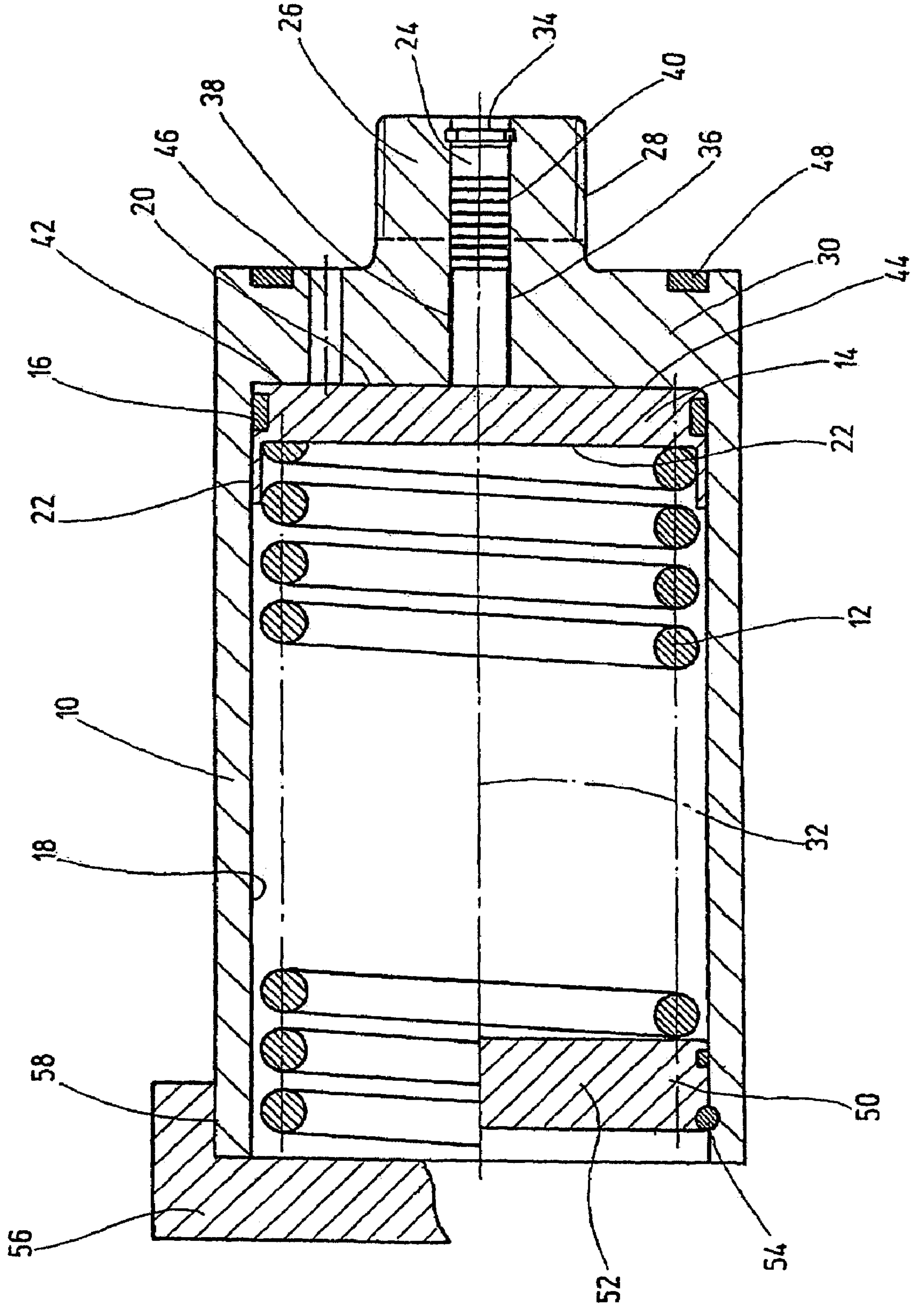
10
12
14
16
18
20
22
22
24
26
28
30
32
34
36
38
40
42
44
46
48
50
52
54
56
58

DEVICE FOR DAMPING PRESSURE SURGES

FIELD OF THE INVENTION

The present invention relates to a device for damping pressure surges in a fluid. The device has a housing and a piston displaceable longitudinally against the pretensioning force of a spring-type accumulator.

BACKGROUND OF THE INVENTION

Devices for damping pressure surges include hydraulic accumulators. One of the main functions of hydraulic accumulators is to receive specified volumes of a pressurized fluid of a hydraulic system and to return them to the system as required. Since the fluid is pressurized, hydraulic accumulators are treated as pressure vessels and must be designed to withstand the maximum operating pressure as determined by the approval standard. For volume equalization in the hydraulic accumulator and as a result the associated storage of energy, the pressurized fluid in the hydraulic accumulator is subjected to the force exerted by a weight, spring, or gas. Equilibrium always prevails between the pressure of the pressurized fluid and the opposing pressure generated by the force of the spring or by the gas. In most hydraulic systems, use is made of hydropneumatic accumulators, that is, ones subjected to the action of a gas and having a separating element. A distinction is made between bladder, piston-type, and diaphragm accumulators.

These hydropneumatic accumulators perform a wide variety of functions in a hydraulic system. For example, in addition to performing the energy storage function referred to, they may be called upon to contribute to absorption of mechanical shocks and to surge damping in hydraulic systems. Pulsations occur in the flow volume especially when hydraulic pumps such as positive-displacement pumps are employed. Such pulsations cause vibrations as well as noise, and may result in damage to the hydraulic system as a whole.

The hydraulic pumps in question, positive-displacement pumps in particular, are also employed in so-called common-rail technology in the area of diesel engines. Recent third-generation developments add piezo technology for injection systems for diesel fuel. The recently developed piezo inline injectors for the third common-rail generation (cf. VDI-Nachrichten [Association of German Engineers-News], No. 33, Aug. 15, 2003) use piezo actor modules, which act by coupler modules on switching valves. The switching valves in turn act on an injector module of the fuel injection system. The outstanding hydraulic rapidity of the system results from the high degree of integration of the inline injector, that is, from the nearness of the piezo package to the valve needle in the tip of the injector. In comparison to the previous generation, the mass moved was reduced in the new systems from 16 g to 4 g. The mass moved is understood to mean the mass of the valve needle and the fuel with which the control space is filled. The respective technical configuration requires very high system pressures, ones reaching the order of magnitude of 2200 bar. The respective system pressure is to be built up by the hydraulic pump indicated, in particular a positive-displacement pump. The build-up is attended by the disadvantages described of pressure and pulsation surges. If the pressure surges are transmitted to the injector system, this transmission may result in critical states of the system and in failure of the piezo injector system with the injection system. If, as is known in the state of the art (see DE 195 39 885 A1), conventional hydraulic accumulators with separating elements (pistons) are included in the diesel fluid system as outlined in the foregoing. They nevertheless encounter their limits in view of the high system pressures indicated of up to 2200 bar.

DE 101 48 220 A1 discloses another device for damping pressure pulsations in a fluid system, especially in a fluid system of an internal combustion engine. The device disclosed comprises a housing in which at least one operating space is present. This space is connected to the fluid system and is limited in area by at least one movable wall element in the form of a metal diaphragm mounted on the edge side in the housing so as to be stationary. This wall element is functionally connected to a first spring unit. To provide the possibility of smoothing out pressure pulsations in the fluid system even with variable pressure present, provision is made such that the device comprises at least a second movable wall element which delimits a second operating space and which has a metal diaphragm fastened on the edge side in the housing. The first spring unit is mounted between the two wall elements in the form of diaphragms and is functionally connected to both. A throttle unit is also provided by which the second operating space is connected to the fluid system. The pressure pulsations in a fluid system may be reliably and efficiently smoothed out with different pressure levels present. However, because of the stationary clamping of the wall elements (diaphragms) their movability is restricted, so that functional safety in operation may be endangered at high pressures and correspondingly large pulsation and pressure surges.

SUMMARY OF THE INVENTION

An object of the present invention is to provide a device for damping pressure surges permitting, even with very high system pressures produced by a hydraulic pump, a diesel fuel pump in particular, ones as high as 2200 bar, damping and/or smoothing out such pressure surges so that there is no harmful introduction of power into a piezo injector system of common-rail technology.

This object is attained by a device having one piston that operates in conjunction with another piston that is be guided so as to be displaceable longitudinally in a connecting piece of the housing. In operation of the device, the one piston exerts a compressive force on the other piston in every displaced position of the latter. Very high-frequency pressure surges may be controlled in the diesel fuel system. Yet, operation remains safe, even if due to the hydraulic pump in the form of the diesel fuel pump very high system pressures of up to 2200 bar and higher are produced. As a result of mechanical uncoupling of the two pistons and the constant application of the compressive force by one piston on the other, any pressure surges introduced are reliably intercepted and controlled. In particular, the uncoupling of the pistons ensures that any leakage accompanied by leakage flows, are kept small or controlled so that operational failures are prevented in the system as a whole. Preferably, one piston is of a diameter several times greater than the diameter of the other piston. An unimpeded actuation process may be achieved with such pistons. Processes of canting of the other piston in the connecting piece of the housing in particular are prevented by separate, independent control of this piston.

In one preferred embodiment of the device of the present invention, the other piston is configured as a stamp and is controlled by at least one anti-loss device in a through opening in the housing of the connecting piece. Free displaceability of the respective piston between specified displaceability limits in the housing configuration is thereby achieved.

In another preferred configuration of the device of the present invention, the other piston is machined to the highest degree on the external circumference side. In particular, the other piston is lapped, so that a metal-sealed gap is obtained at least between parts of the external circumference and the other piston on the inner wall of the opening in the housing. In another configuration of the sealing system, the other piston may be provided with annular or lubrication grooves on the external circumference side. As a result, despite the high pressures of up to 2200 bar and above in the diesel fluid system, reliable sealing of the other piston from the interior of the housing with the first piston is achieved. Especially when annular or lubricating grooves on the external circumference of the other piston are used, a fluid seal may be built up which works against entry of fluid into the gap in the metal.

If, in another preferred embodiment of the device of the present invention, a leakage opening configured in the housing communicates with the fluid space between the pistons, diesel medium which succeeds in penetrating the interior of the housing may nevertheless be transferred free of pressure in the block as a sort of return flow for oil leakage in the direction of the tank or leakage side.

With respect to the very high pressures indicated, it has been found to be advantageous to provide as a spring-type accumulator at least one helical spring configured as pressure spring and/or a pressure gas. Use of a pure pressure gas may entail the disadvantage that, in view of the very high pressures, a process of liquefaction of the gas will take place in the housing area as a result of compression of the piston first indicated. However, as an alternative or in addition, the system pressures indicated may be reliably controlled by use of a pressure spring as the spring-type accumulator.

Other objects, advantages and salient features of the present invention will become apparent from the following detailed description, which, taken in conjunction with the annexed drawing, discloses preferred embodiments of the present invention.

BRIEF DESCRIPTION OF THE DRAWINGS

Referring to the drawings which form a part of this disclosure:

FIG. 1 is a diagrammatic, side elevational view in section of a device for damping pressure surges, according to embodiments of the present invention, not drawn to scale, with two different cover element embodiments.

DETAILED DESCRIPTION OF THE INVENTION

The illustrated device performs the function of damping pressure surges in a fluid, in particular one in the form of diesel fuel. The device has a cylindrical housing 10 and has a piston 14 which may be displaced longitudinally against the initial pretensioning force of a spring-type accumulator 12. The respective piston is configured as a cylindrical contact plate and is guided along its external circumference by a slip and/or sealing ring 16 along the cylindrical interior circumference or surface 18 of the housing 10. The piston 14 accordingly has on its opposite sides two essentially level or planar contact surfaces 20, 22. For the purpose of guiding the spring-type accumulator 12, the piston 14 is provided on the side facing accumulator 12, with a cylindrical guide surface 22. Guide surface 22 also rests against the inner surface 18 of the housing 10 on the guide surface outer circumference side.

The first piston 14 operates in conjunction with another or second piston 24. The other piston 24 may be guided to be longitudinally displaceable in a connecting piece 26 of the housing 10. As the illustration shows, the piston 14 furthermore operates in the housing by applying the compressive force to the other piston 24, in every displaced operating position, including its front end contact position as shown, in operation or use of the device. The connecting piece 26 narrows in stages toward the free end of the housing 10 and is provided on the outer circumference side with a connecting thread 28 by means of which the housing 10 in the configuration illustrated may be connected to a fluid system, such as the diesel supply line for an injector system by the common rail technology. The housing 10 is positioned in a connecting line which leads to a hydraulic pump, a positive-displacement pump in particular, for example, one in the form of a diesel fuel pump or the like. The pressure surges occurring in operation of the diesel fuel pump, which may be considerable, with system pressures of up to 2200 bar or higher, are damped and smoothed out by the device of the present invention. Even high-frequency fluid surges are to be evened out. In addition, the damping device of the present invention is independently effective within prescribed limits even in the event of very high pressure amplitudes.

The respective connecting piece 26 undergoes transition to a bottom 30 of the housing 10, which bottom is strengthened lengthwise. The pistons 14, 24 and the spring-type accumulator 12 are oriented longitudinally along the longitudinal axis 32 of the housing 10 and connecting piece 26. In addition, the diameter of the piston 14 is several times greater than the diameter of the other piston 24, so that very good impact force is introduced between the other piston 24 and first piston 14, in view of the change in the relative diameters.

The other piston 24 is configured as a stamp or push rod and is guided in the through opening in the housing 36 of the connecting piece 26, and is retained therein by at least one anti-loss device 34 in the form of a retaining ring. The anti-loss device 34 in particular can be a retaining ring, the front of which seals the housing opening 36 from the exterior and the projecting length of which comes in contact with the front end of the other piston 24 when the other piston is in its front limit position. When the other piston 24 is not in operation, its length has been determined so that the piston remains at a short axial distance, with slight clearance, from the anti-loss device 34. However, as soon as a specified pressure level has been built up by the fuel, the clearance is eliminated. When the device is in the respective state of operation or use, the piston 14 applies a compressive force to the other piston 24 in any displaced position of the latter. In order to obtain good sealing, the other piston 24 undergoes the highest degree of precision machining on the external circumference side, in particular is lapped, so that a metal-sealed gap 38 is obtained at least between parts of the external circumference of the other piston 24 and the interior wall of the housing opening 36. The other piston 24 has annular or lubricating grooves 40 for the purpose of further improvement in the sealing system. A labyrinth seal is thus obtained, one which makes it difficult for the diesel fuel to penetrate through the housing opening 36 into the clearance space 42 inside the housing 10 between the contact surface 20 and the facing surface 44 of the bottom 30.

The fluid or clearance space 42 between the pistons 14 and 24 communicates with a leakage opening 46 in the form of a bore in the housing 10. Consequently, an intentionally provided gap or leakage flow may be evacuated by the sealing system in the form of annular or lubricating grooves 40, the metal gap 38, and the clearance space 42 by the leakage opening 46 to the pressure-free leakage or tank side of the overall system. A sealing system 48, such as one in the form of a conventional radial seal ring, is provided as an additional sealing system in the front area of the bottom 30. When the housing 10 has been screwed into place, sealing, especially in the form of the leakage opening 46, from the overall hydraulic or fluid system (diesel line network) may accordingly be effected by the connecting piece 26 with its connecting thread 28.

A pressure spring in the form of a helical spring in this instance serves as a spring-type accumulator 12. Pressure gas, such as gas in the form of nitrogen, may be applied in addition to the interior of the housing. The respective pressure spring 12 extends between the piston 14 and a cover element 50. The cover element 50 may be in the form of a retaining plate 52, and is retained in the housing 10 by safety means, a retaining ring 54 in particular. An alternative embodiment is presented in the figure in square framing. In this instance, the cover element 50 is a screw cap 56 screwed onto the housing 10 by external threading 58 on the external circumference side of such housing 10.

The device of the present invention makes certain that any leakage flow which may occur may be reliably controlled and that the separate piston configuration of the pistons 14 and 24 ensures that canting does not occur. Pressure surges of very high frequency, in particular which affect the stamp-like additional piston 24, may be transmitted at the same frequency as surges to the piston 14, which then effects pulsation damping or smoothing by reacting on the other piston 24. The system illustrated may be applied cost-effectively and produced by simple production technology with conventional steel materials, on the housing 10 side in particular. This device may generally be employed where low volumes under high pressure are to have the level damped or are to be displaced. Because of the surface relationships of the pistons, the spring to be employed may be made smaller, since the force required is correspondingly reduced.

While various embodiments have been chosen to illustrate the invention, it will be understood by those skilled in the art that various changes and modifications can be made therein without departing from the scope of the invention as defined in the appended claims.

What is claimed is:

1. A device for damping pressure surges in a fluid, comprising:

a housing having a longitudinal axis and a connecting piece;

a spring-type accumulator in said housing;

a first piston displaceable in said housing against pretensioning forces of said accumulator;

a second piston displaceable in said connecting piece along said longitudinal axis, said first and second pistons being mechanically uncoupled, said accumulator biasing said first piston such that said first piston exerts a compressive force on said second piston and said pistons are in constant contact with one another in all positions of said pistons and extending axially along an entire length thereof between oppositely axially facing surfaces of said first piston and said housing, said first and second pistons being in a non-overlapping arrangement and extending in opposite directions from abutting surfaces thereof; and an anti-loss device is attached to said connecting piece at a side of said second piston remote from said first piston.

2. A device according to claim 1 wherein said first piston has a diameter several times greater than a diameter of said second piston.

3. A device according to claim 1 wherein said second piston is configured as a stamp inserted through an opening in a housing portion of said connecting piece.

4. A device according to claim 3 wherein said second piston has a highly machine, lapped outer circumferential surface; and a gap of a metal thickness extends between said outer circumferential surface of said second piston and an inner wall of said opening in said housing portion.

5. A device according to claim 1 wherein said second piston has annular lubricating grooves on an outer circumferential surface thereof.

6. A device according to claim 1 wherein said housing comprises a leakage opening extending therein and in fluid communication with a fluid space between said first and second pistons.

7. A device according to claim 1 wherein said accumulator is a helical spring.

8. A device according to claim 7 wherein said accumulator comprises pressurized gas.

9. A device according to claim 7 wherein said helical spring extends between and directly engages said first piston and a cover element mounted inside said housing.

10. A device according to claim 9 wherein said cover element is a retaining plate retained in said housing by a retaining ring.

11. A device according to claim 9 wherein said cover element is fixedly coupled to said housing.

12. A device according to claim 1 wherein said accumulator comprises pressurized gas.

13. A device according to claim 1 wherein said accumulator extends between and directly engages said first piston and a cover element coupled to said housing.

14. A device according to claim 13 wherein said cover element is a screw cap screwed on external threads on an outer circumferential surface of said housing.

15. A device according to claim 13 wherein said cover element is fixedly coupled to said housing.

16. A device according to claim 1 wherein said connecting piece has an external diameter small than an external diameter of a remaining portion of said housing.

* * * * *